United States Patent
Ghosh et al.

(10) Patent No.: US 7,206,196 B2
(45) Date of Patent: Apr. 17, 2007

(54) COMPUTER SYSTEM WITH DETACHABLE DISPLAY

(75) Inventors: Prosenjit Ghosh, Portland, OR (US); Shreekant Suryakant Thakkar, Portland, OR (US); Hong Wong, Portland, OR (US); Nicholas Waddell Oakley, Portland, OR (US); Truong V. Phan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 552 days.

(21) Appl. No.: 10/663,013

(22) Filed: Sep. 15, 2003

(65) Prior Publication Data

US 2005/0057516 A1    Mar. 17, 2005

(51) Int. Cl.
*G06F 1/16* (2006.01)
(52) U.S. Cl. .................. 361/683; 361/681; 345/168; 248/917
(58) Field of Classification Search ............... 361/683, 361/681; 248/917–924; 345/168
See application file for complete search history.

(56) References Cited

U.S. PATENT DOCUMENTS

| | | | | |
|---|---|---|---|---|
| 5,200,913 A * | 4/1993 | Hawkins et al. | ............ | 361/681 |
| 5,255,214 A | 10/1993 | Ma | ............ | 364/708.1 |
| 6,108,200 A | 8/2000 | Fullerton | ............ | 361/686 |
| 6,317,315 B1 | 11/2001 | Lee et al. | ............ | 361/681 |
| 6,430,038 B1 * | 8/2002 | Helot et al. | ............ | 361/681 |
| 6,780,019 B1 * | 8/2004 | Ghosh et al. | ............ | 439/31 |
| 6,833,615 B2 | 12/2004 | Geng et al. | ............ | 257/698 |
| 6,903,927 B2 * | 6/2005 | Anlauff | ............ | 361/681 |
| 6,961,234 B2 * | 11/2005 | Tanaka et al. | ............ | 361/681 |
| 7,014,154 B2 * | 3/2006 | Jeong et al. | ............ | 248/157 |
| 2002/0024499 A1 | 2/2002 | Karidis et al. | ............ | 345/156 |
| 2002/0050980 A1 | 5/2002 | Furuki et al. | ............ | 345/168 |
| 2002/0181722 A1 | 12/2002 | Hibino et al. | ............ | 381/92 |

FOREIGN PATENT DOCUMENTS

| | | |
|---|---|---|
| EP | 0 458 316 A2 | 5/1991 |
| WO | WO 97/04380 | 2/1997 |
| WO | WO 00/07115 | 2/2000 |
| WO | WO 00/60438 A3 | 10/2000 |
| WO | WO 01/37070 A3 | 5/2001 |

OTHER PUBLICATIONS

Prosenjit Ghosh, "Tablet Computer System with a Detachable Base", U.S. Appl. No. 10/367,380, filed Feb. 14, 2003.
Prosenjit Ghosh, "Positioning Mechanism for a Pen-Based Computing System", U.S. Appl. No. 10/367,363, filed Feb. 14, 2003.

* cited by examiner

*Primary Examiner*—Lisa Lea-Edmonds

(57) ABSTRACT

A computer system includes a support arm that when unfolded may enable a display section to be operated in a laptop mode, tablet mode, or convertible mode. A latching mechanism engages or disengages the support arm to or from the display section.

19 Claims, 17 Drawing Sheets

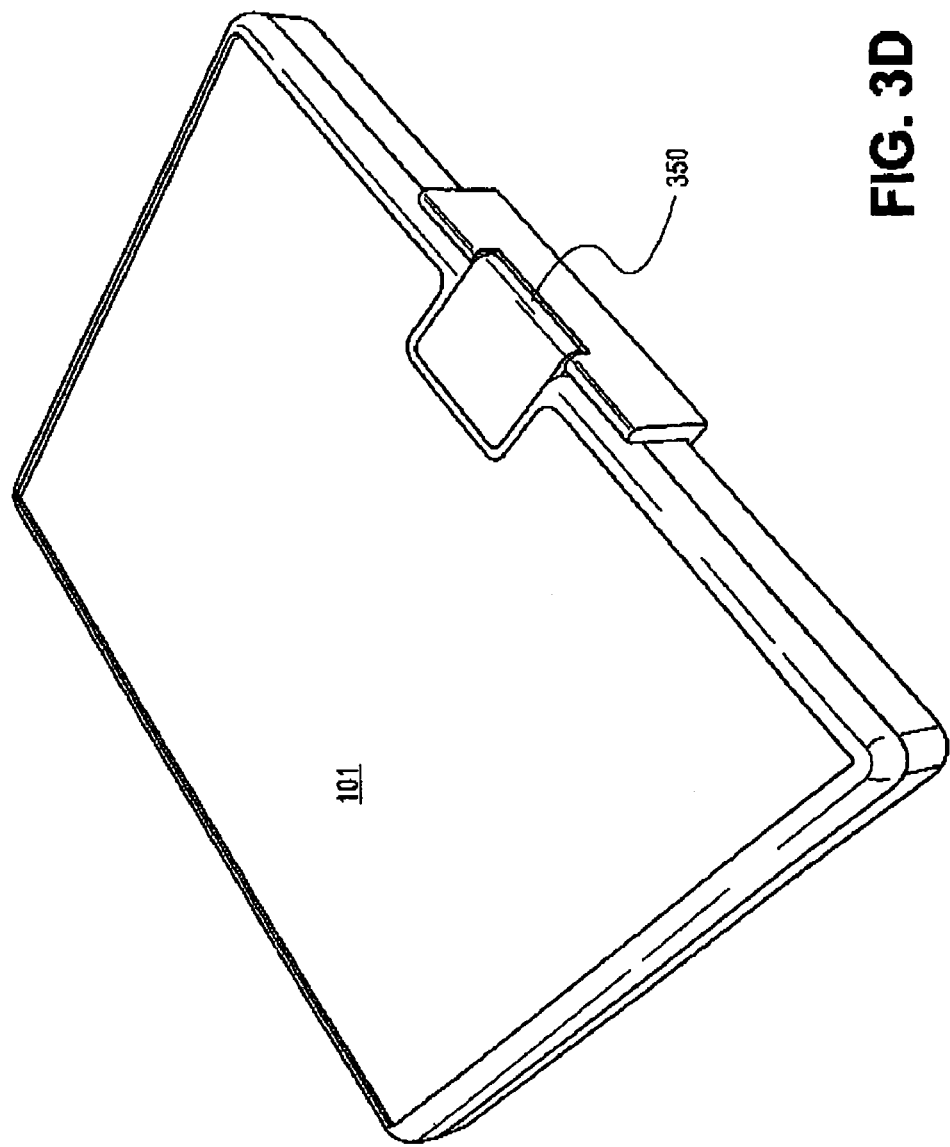

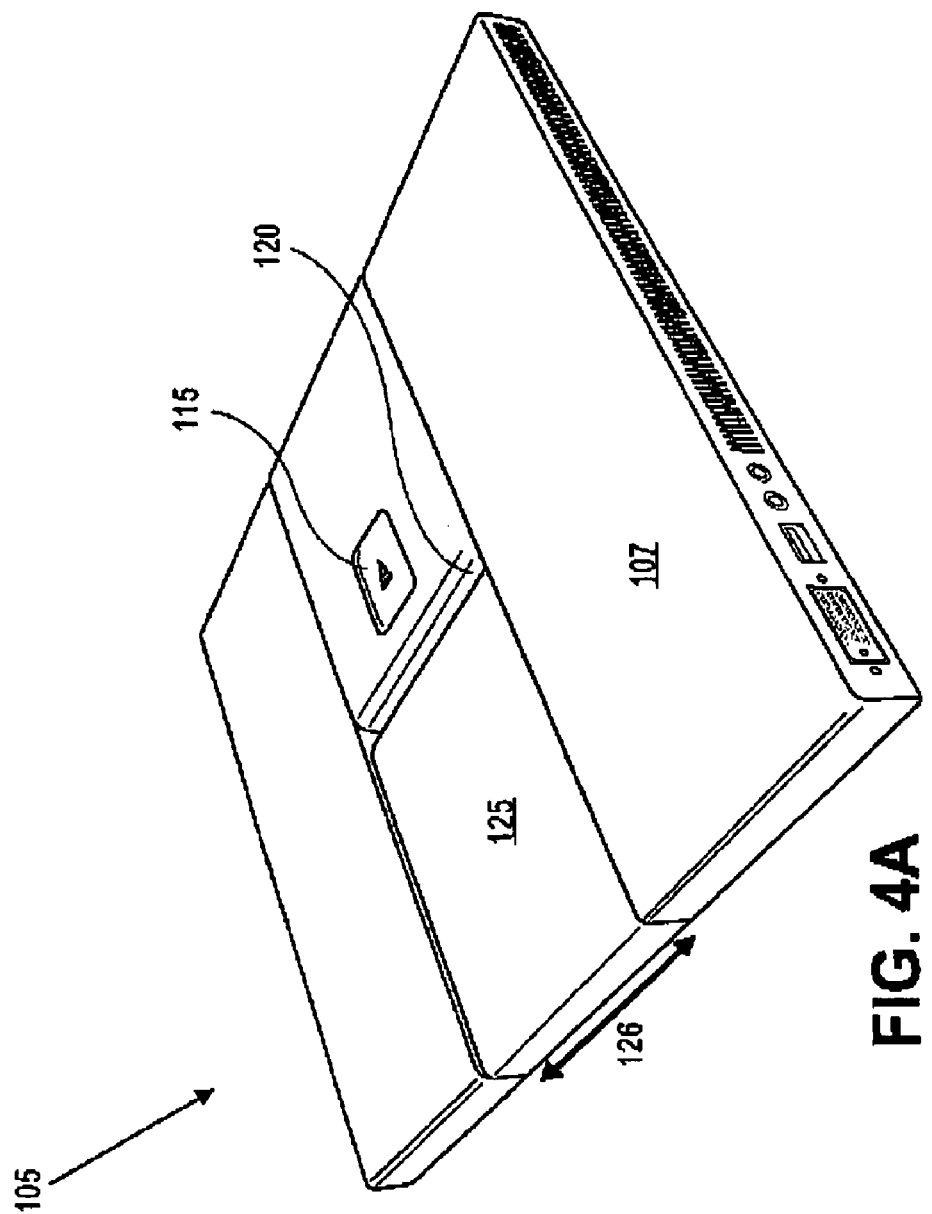

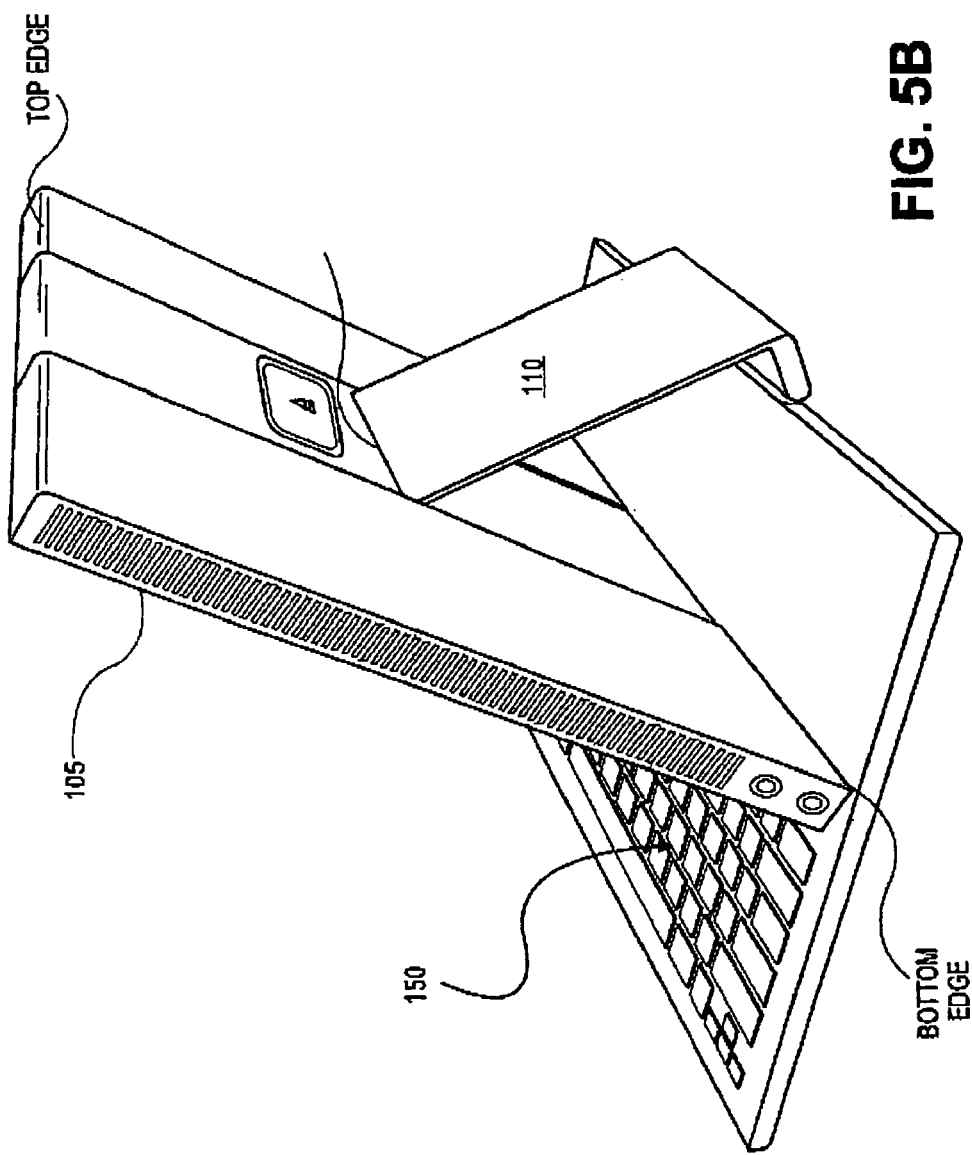

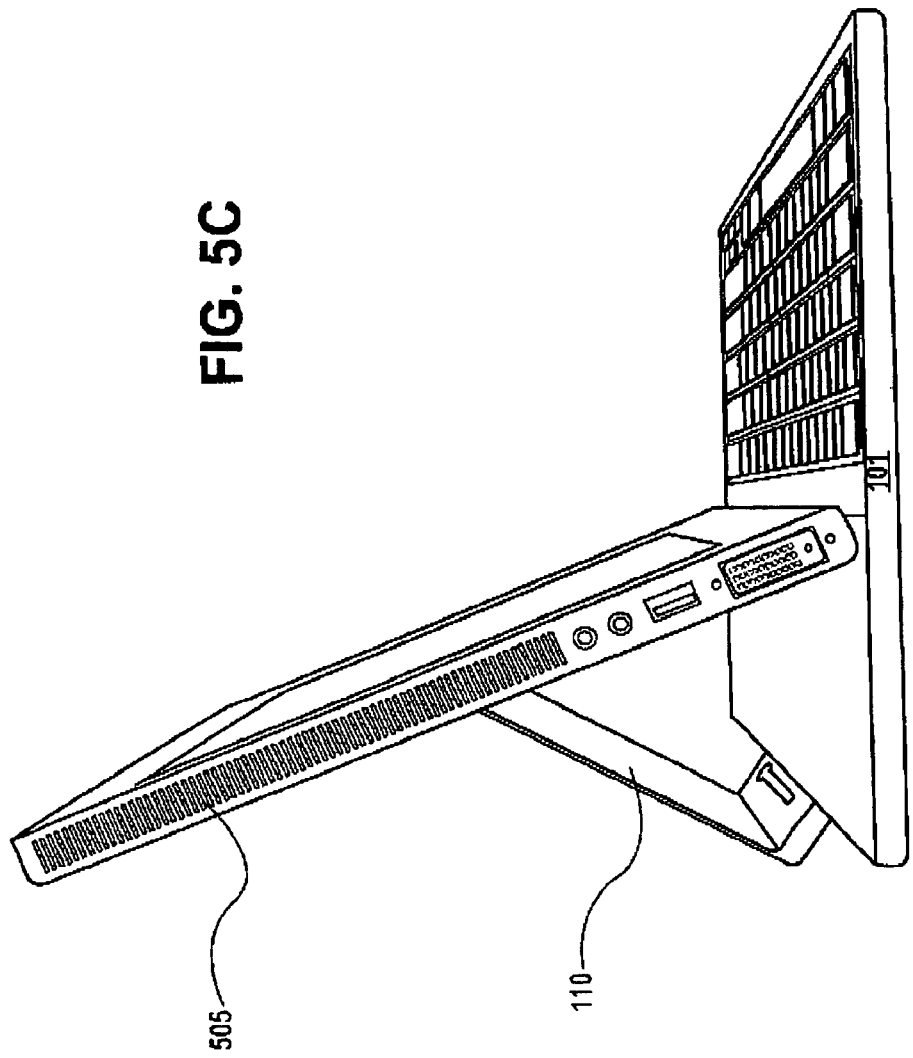

COMPUTER SYSTEM WITH DETACHABLE DISPLAY

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention generally relates to the field of computer systems and more particularly related to computer systems that include detachable displays.

BACKGROUND

Laptop computers, also referred to as notebook computers, are normally lightweight, battery-powered or AC-powered computer system. A laptop computer can be transported and used by a user in different environments including, for example, on an airplane, in a library, at a coffee shop, etc. The laptop computer generally has a clam-shell form factor which includes a display section and a base section coupled to one another using a hinge mechanism. The display section typically includes a display screen, and the base section typically includes a keyboard and other electronic components (e.g., processor, memory, buses, storage drives, a battery, etc.).

The laptop computer may be closed by folding the display section on top of the base section. A latching mechanism may be used to engage and lock the display section with the base section. The latching mechanism may also be used to disengage the display section from the base section and to unfold the display section. Tablet computers are typically computer systems that include touch sensitive display screens and use styluses rather than keyboards for input. Handwriting recognition software may be used to recognize a user's handwriting. Because the tablet computer does not include a keyboard, it may be more compact and easier to transport than a laptop computer. Being able to use a stylus is one of the advantages of using a tablet computer because the user can practically enter information into the tablet computer at any location. For example, the user may enter information while standing or when there is limited or no surface to rest the tablet computer on. On the other hand, some users may prefer the laptop computers because they may feel more comfortable entering information using a keyboard than a stylus, or they may find it faster to type than to write.

BRIEF DESCRIPTION OF THE DRAWINGS

The invention is illustrated by way of example and not limitation in the figures of the accompanying drawings, in which like references indicate similar or identical elements, and in which:

FIGS. 3A–D illustrate examples of the support arm of the computer system, in accordance with one embodiment.

FIGS. 4A–4B illustrate examples of the computer system 100 in a tablet mode, in accordance with another embodiment.

FIGS. 5A–5F illustrate examples of the computer system 100 in a laptop mode, in accordance with one embodiment.

DETAILED DESCRIPTION

For one embodiment, a computer system having a detachable display is disclosed. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Overview

Figure 1:
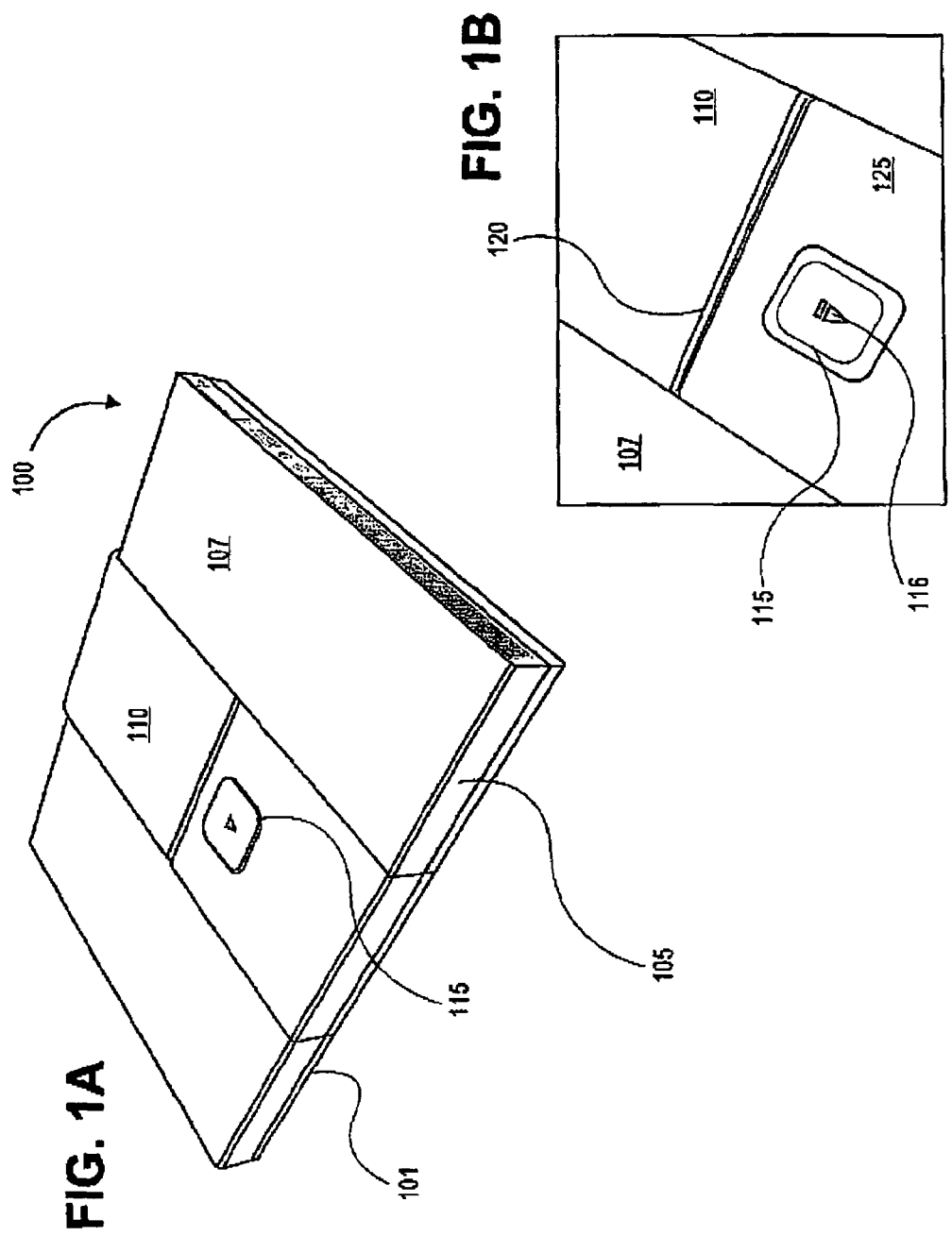
FIG. 1A illustrates one example of a computer system, in accordance with one embodiment.
FIG. 1B illustrates one example of a latching mechanism, in accordance with one embodiment.

FIG. 1A illustrates one example of a computer system, in accordance with one embodiment. Computer system 100 may include a base section 101 and a display section 105. The base section 101 may include a keyboard (not shown). The display section 105 includes a back side 107 and a front side (not shown). The front side may include a display screen (not shown). Although not shown, the display section 105 may also include a processor, electronic components, circuit boards and the like. For one embodiment, the display section 105 may include all the processing components of the computer system 100 and thus may operate by itself without the base section 101.

Figure 2:
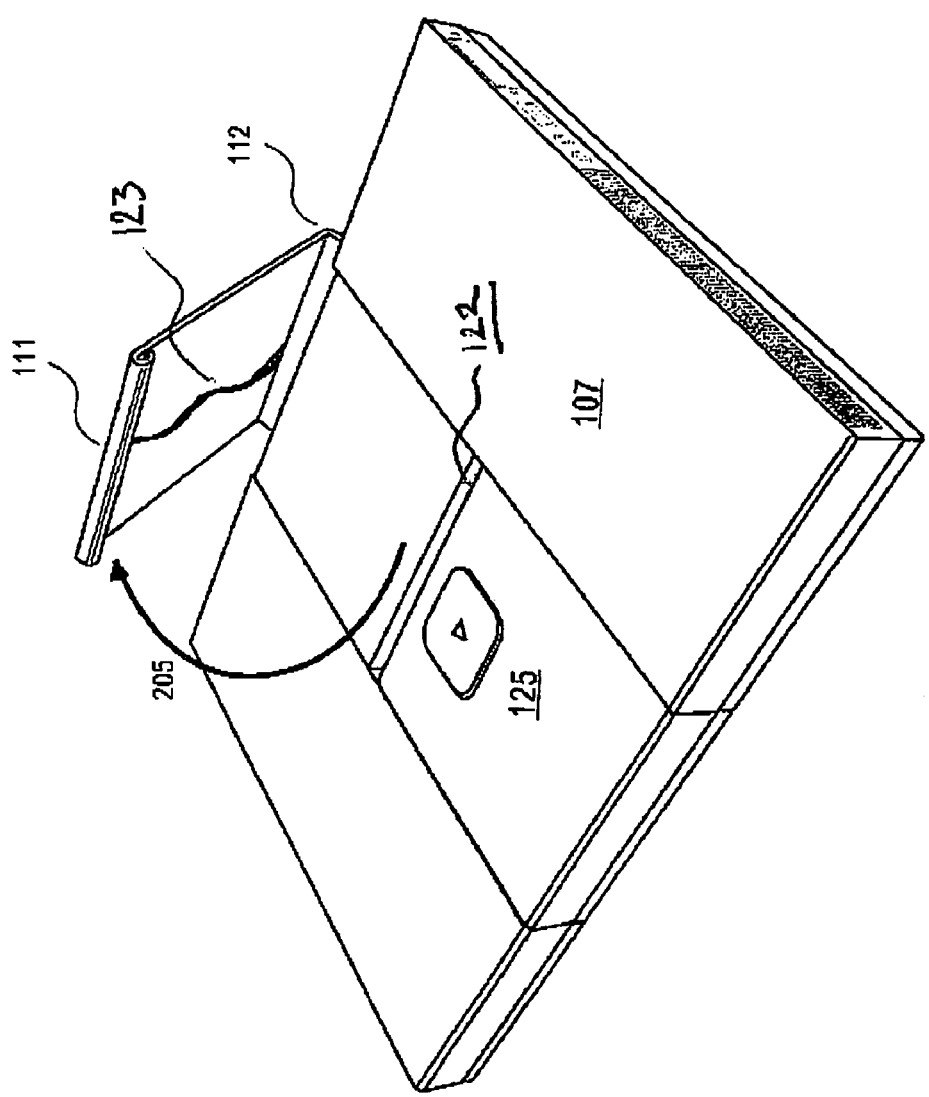
FIG. 2 illustrates one example of how a support after may be unfolded from a display section, in accordance with one embodiment.

For one embodiment, the computer system 100 may also include a support arm 110. As will be shown, the support arm 110 may be folded onto or unfolded from the back side 107 of the display section 105. The support arm 110 may be detachably coupled to the display section 105 at receptacle or channel 120 on the back side 107. For one embodiment, when the support arm 110 is coupled to the display section 105 at the channel 120, the support arm 110 may be engaged or locked by a latching mechanism 115. Depending on mode of operation, the computer system 100 may operate with or without the keyboard Support Arm FIG. 1B illustrates one example of the latching mechanism 115, in accordance with one embodiment. The latching mechanism 115 and the channel 120 may be part of the back side 107 of the display section 105. Alternatively, the latching mechanism 115 and the channel 120 may be part of a panel 125 that is affixed, embedded or attached solidly or semi-solidly to the back side 107 of the display section 105. The support arm 110 may be disengaged or released by the latching mechanism 115 when force is applied to the latching mechanism 115. For example, when the latching mechanism 115 is pushed away from the support arm 110 in the direction shown by the arrow 116, the support arm 110 may be released from the channel 120. The support arm 110 may then be lifted or unfolded from the back side 107. FIG. 2 illustrates one example of how the support arm 110 may be unfolded from the display section 105, in accordance with one embodiment. The support arm 110 may include a first end 111 and a second end 112. The first end 111 of the support arm 110 may be lifted off the back side 107 of the display section 105 in the direction shown by arrow 205. In the examples illustrated in FIGS. 1A and 2, the display section 105 overlaps with the base section 101, and the back side 107 of the display section 105 is exposed. In these examples, the computer system 100 may be considered to be in a closed-lid mode. In the closed-lid mode, the computer system 100 may or may not be active.

For one embodiment, when the first end 111 of the support arm 110 is lifted, the display section 105 may be detached from the base section 101. FIG. 3A illustrates one example of the support arm 110 after the display section 105 is detached from the base section 101. For one embodiment, the first end 111 of the support arm 110 may be adapted to couple with the display section 105 at the channel 120. For example, the first end 111 may include a lip 113. The lip 113 may enable the support arm 110 to be engaged by the latching mechanism 115.

Figure 3C:
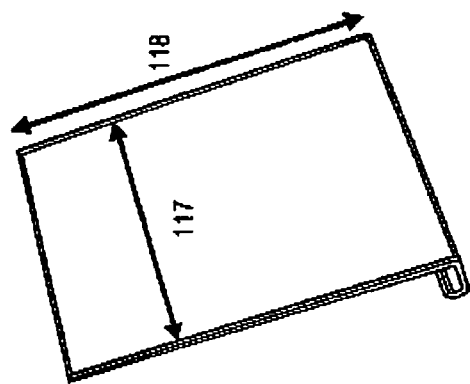
Figure 3A:
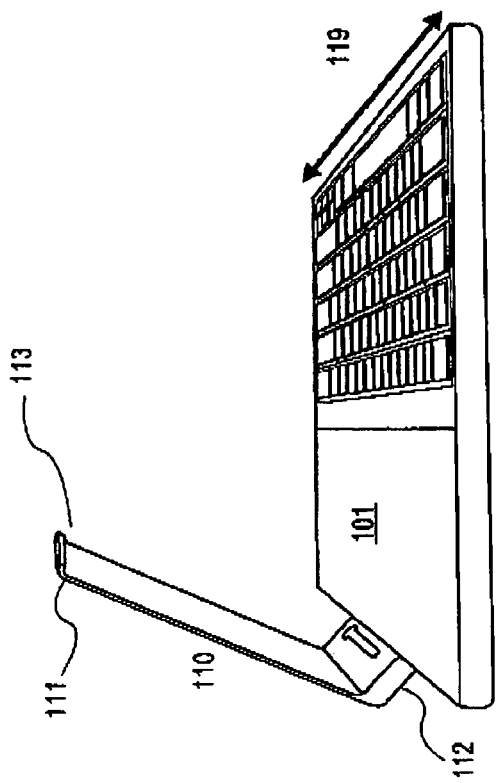
Figure 3B:
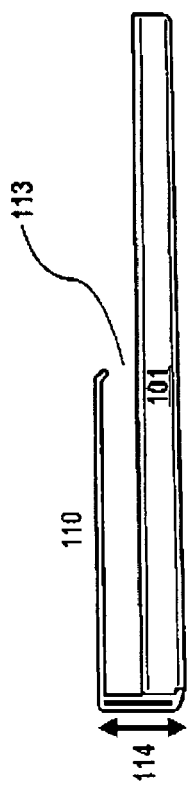

For one embodiment, the second end 112 of the support arm 110 may generally form a corner, as illustrated in FIGS. 3A and 3B. For example, the second end 112 may be in an "L" shape. The shape of the second end 112 may enable the support arm 110 to accommodate the display section 105 when the display section 105 is placed on top of the base section, as illustrated in FIGS. 1A and 2. The support arm 110 may have width 117. The width 117 may be substantially similar to length of the channel 120. It may be noted that the display section 105 and the base section 101 may have the same width 119, and the width 117 of the support arm 110 may not be the same as the width 119 of the display section 105. However, the width 117 of the support arm 110 may need to be large enough to support the display section 105 and to give the display section 105 stability.

Base Section—Keyboard

For one embodiment, the channel 120 may include a keyboard interface 122. For another embodiment, the support arm 110 may include a keyboard cable 123. The keyboard interface 122 may be coupled with one end of the keyboard cable 123 when the support arm 110 is coupled with the display section 105 at the channel 120. For one embodiment, another end of the keyboard cable 123 is coupled with a keyboard 150 located at the top of the base section 101, as illustrated in FIG. 3A. The keyboard 150 may be used to input information into the computer system 100.

FIG. 3D illustrates one example of the bottom view of the base section 101, in accordance with one embodiment. For one embodiment, the support arm 110 may be attached to the base section 101 using a hinge mechanism 350. The hinge mechanism 350 may allow the support arm 110 to rotate forming different angles with the base section 101. The hinge mechanism 350 may include, for example, screw, pin, etc. For one embodiment, the hinge mechanism 350 may include a release mechanism (not shown) to detach the support arm 110 from the base section 101.

Display Section—Tablet Mode

FIG. 4A illustrates one example of the back side 107 of the display section 105, in accordance with one embodiment. In this example, the display section 105 is illustrated as being separated from the base section 101 and the support arm 110. The panel 125 is shown as being attached to the back side 107, as described above. The panel 125 may wrap around the back side 107 of the display section 105 from one edge to another edge (or between a top edge and a bottom edge when the display section 105 is in an upright position). For one embodiment, the width 126 of the panel 125 may be substantially similar to the width 117 of the support arm 110.

Figure 4B:
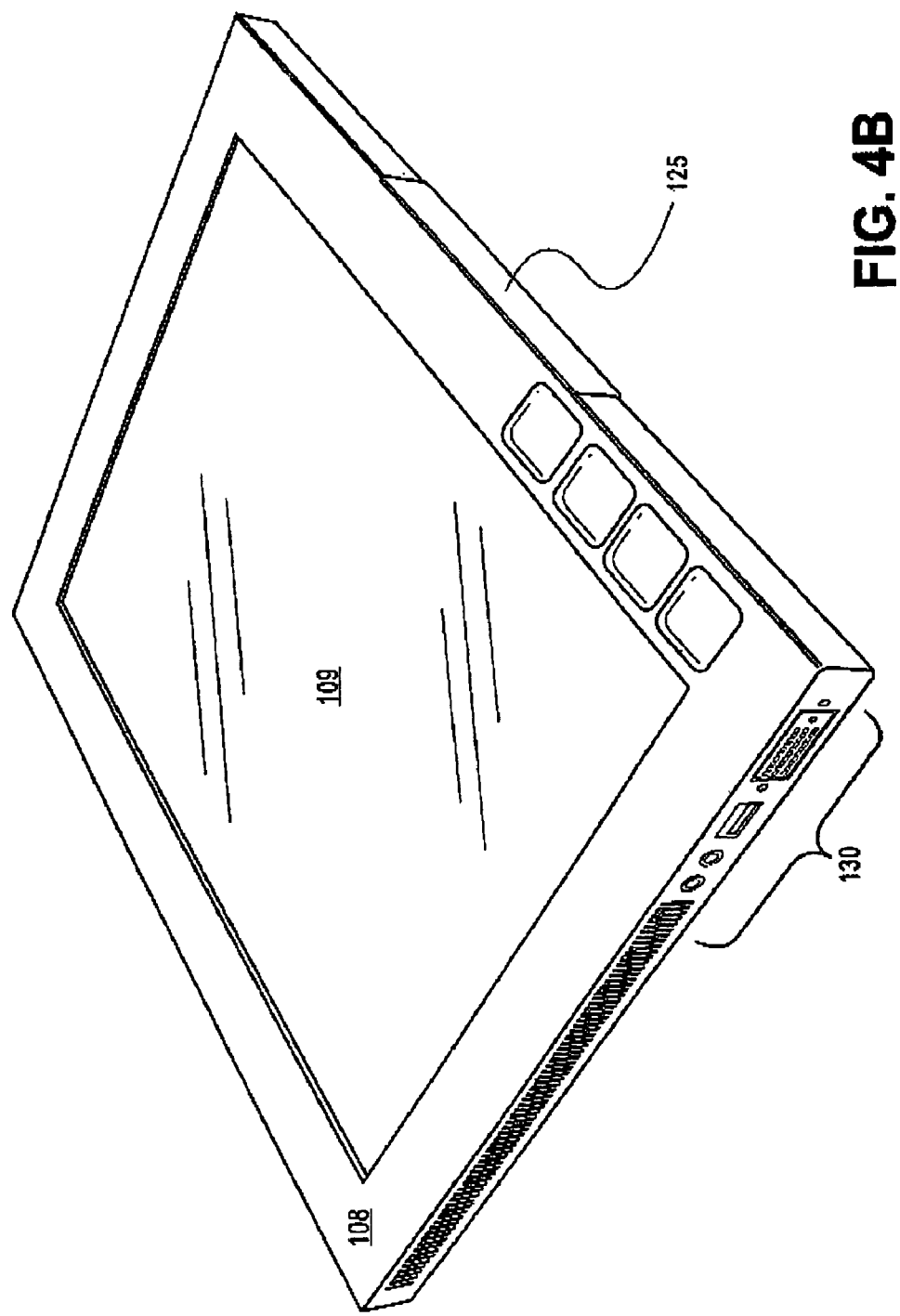

FIG. 4B illustrates one example of the front side of the display section 105, in accordance with one embodiment. The front side 108 may include a display screen 109. The display screen 109 may be flat and may be a liquid crystal display (LCD), plasma display, or another type of display. For one embodiment, the display screen 109 may be a touch-sensitive screen. This may enable a user to input information using a digital pen (not shown) typically referred to as a stylus.

For one embodiment, the display section 105 may include hardware and software logic to enable it to operate independently of the base section 101. For example, although not shown, the display section 105 may include a central processing unit (CPU), memory, storage devices, bus, etc. The display section 105 may also include one or more connectors 130 to accommodate external input/output (I/O) devices, etc. Other devices and logic may also be included in the display section 105. In this example, the computer system 100 may be considered to be in a tablet mode. It may be noted that when the support arm 110 is detached from the base unit 101 and remains engaged in the channel 120, the support arm 110 may be used to support the display unit 105 in an upright position.

Laptop Mode

Figure 5A:
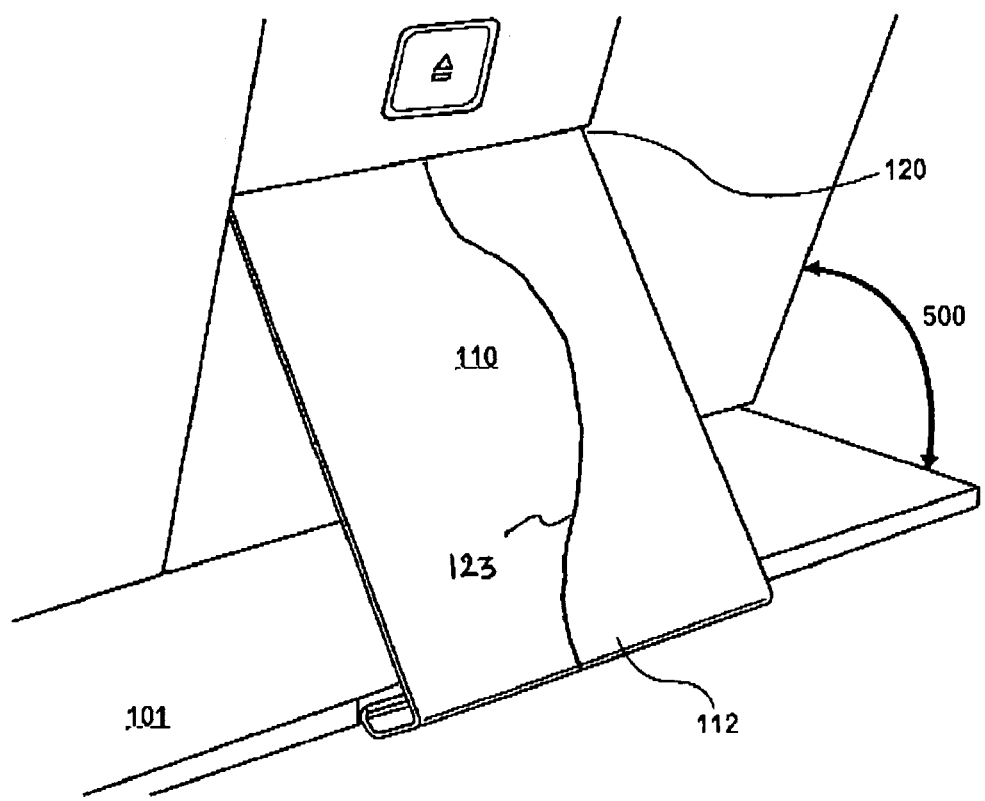
Figure 5D:
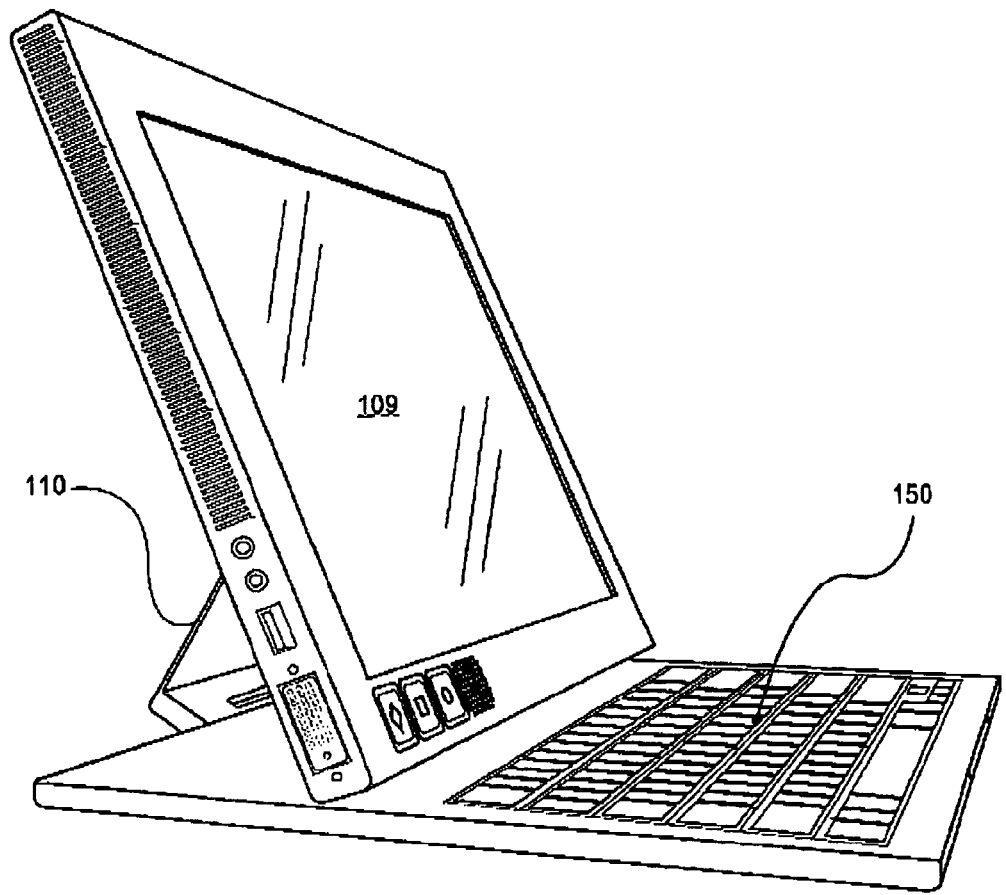
Figure 5E:
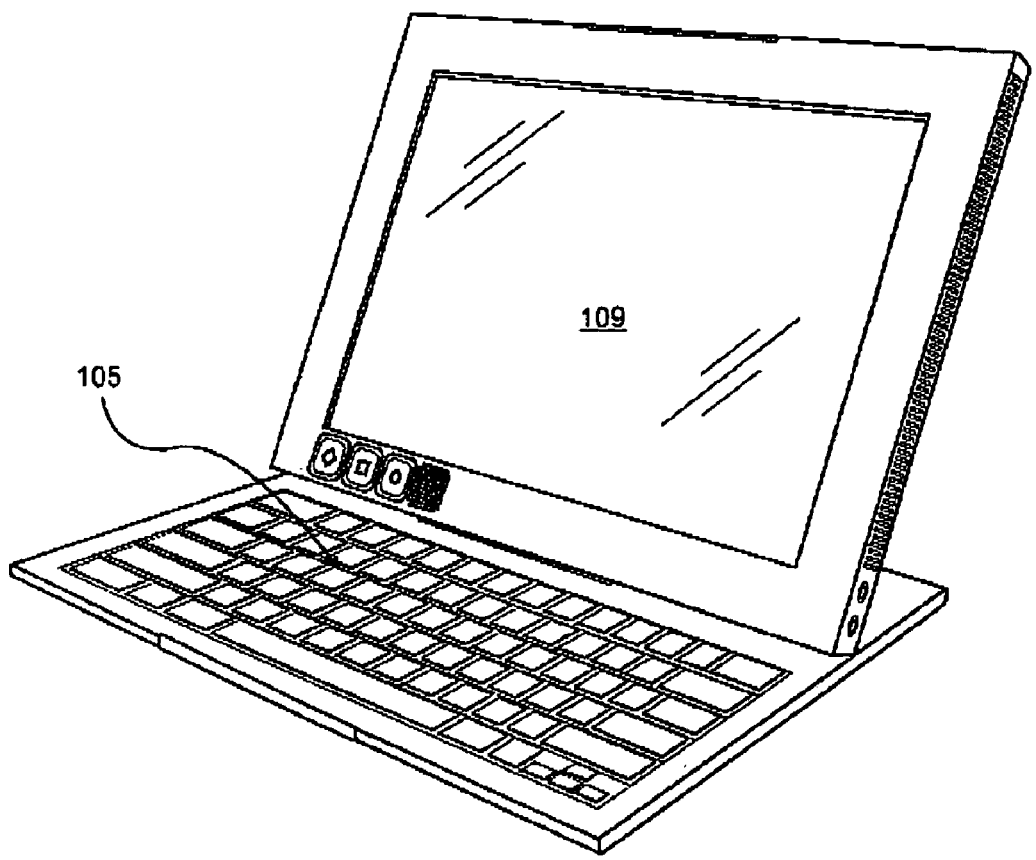
Figure 5F:
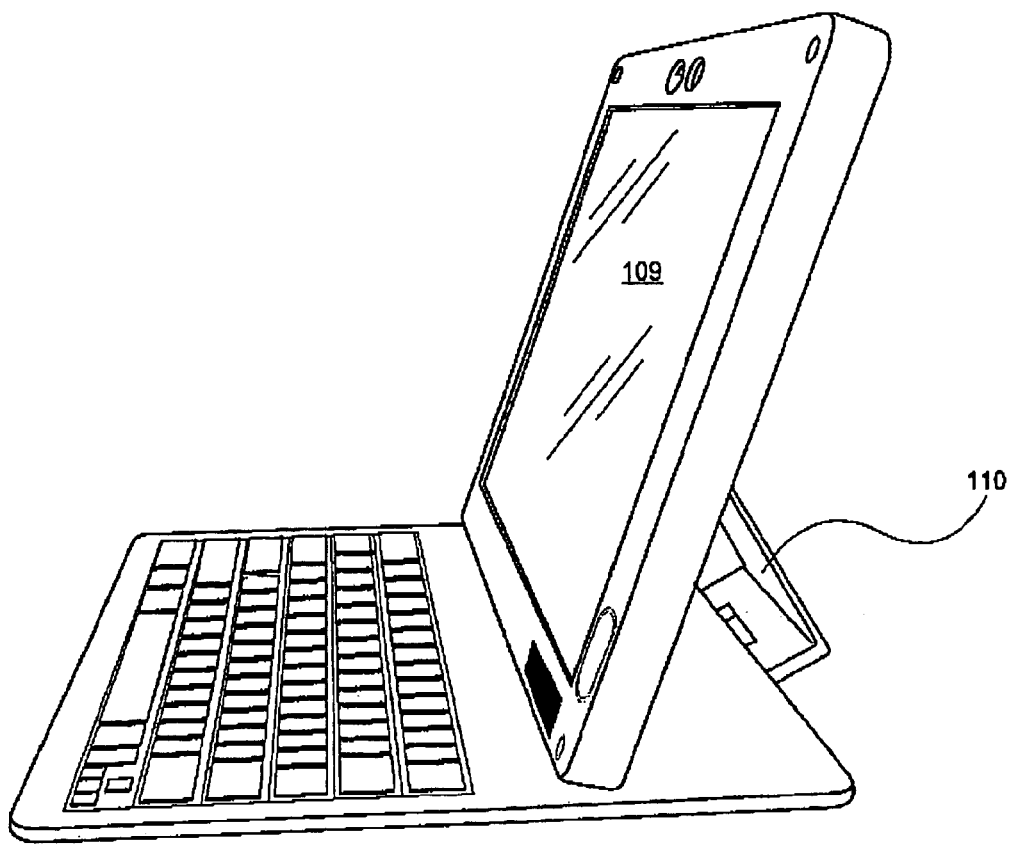

FIG. 5A illustrates one example of the computer system 100 in a laptop mode, in accordance with one embodiment. In the laptop mode, the support arm 110 is attached to the base section 101, and the display section 105 may be placed in a generally upright position relative to the base section 101. For example, when the display screen 109 is positioned to generally face the keyboard 150, the display section 105 may rest against the support arm 110 by joining the lip 113 of the support arm 110 into the channel 120. This may also couple the keyboard cable 123 in the support arm 110 with the keyboard interface 122 in the channel 120. In this example, the display section 105 may form an angle 500 with the base section 101, and the computer system 100 may be considered to be in the laptop mode. For one embodiment, the keyboard 150 may be a wireless keyboard. In this situation, there may not be a keyboard interface in the channel 120, and there may not be a keyboard cable in the support arm 110.

FIGS. 5B–5F illustrate examples of different views of the computer system 100 in the lap top mode, in accordance with one embodiment. The display section 105 may be upright and may be placed in contact with the base section 101 toward the back of the base section 101. The display section 105 may include one or more vents or openings 505 for air flow to help with cooling, as illustrated in FIG. 5C. It may be necessary to prevent the bottom edge of the display section 105 to slide freely across the base section

101. For one embodiment, the bottom edge of the display section 105 may be in a form that may cause friction to be introduced when the display section 105 is about to slide. For one example, the bottom edge of the display 105 may include multiple grooves (not shown). For another example, the bottom edge of the display 105 may include a material that may resist from sliding across the base section 101. Other methods may also be used to prevent the bottom edge of the display section 105 from sliding when the computer system 100 is in the laptop mode.

Authentication Sensor

Figure 6A:
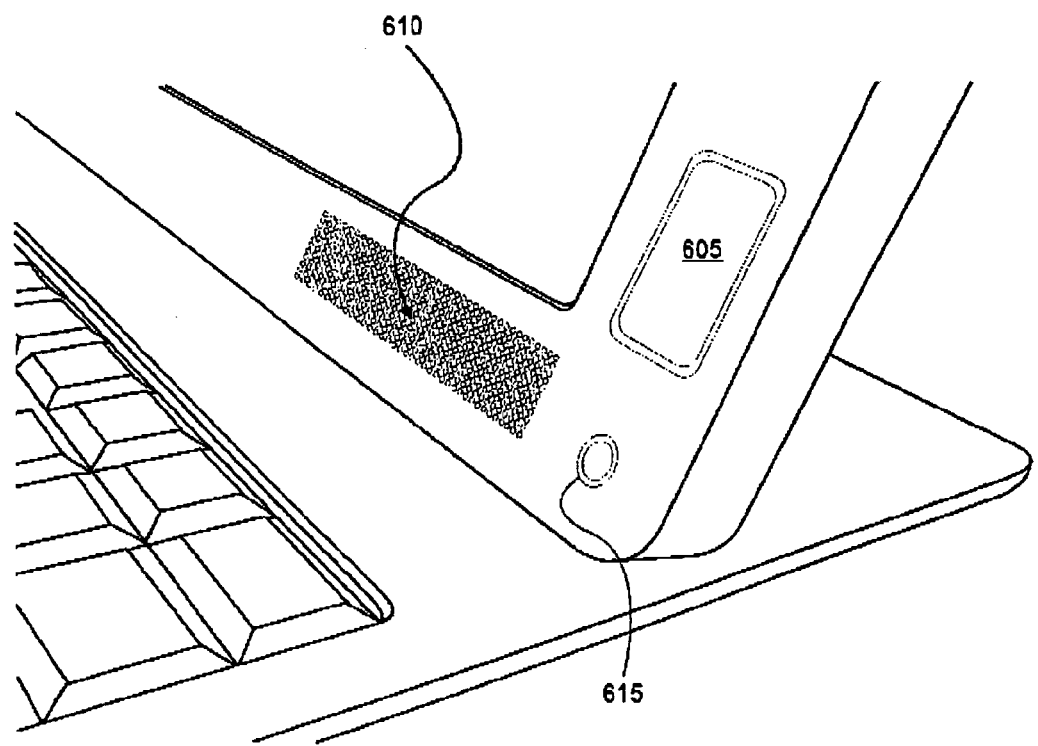
FIG. 6A illustrates an example of an authentication sensor of the computer system, in accordance with one embodiment.

FIG. 6A illustrates an example of the front side 108 of the display section 105 of the computer system 100, in accordance with one embodiment. The front side 108 may also include a sensor 605 to enable access authentication. The sensor 605 may be a fingerprint sensor. In this example, the sensor 605 may be located below the display screen 109. One skilled in the art may recognize that the sensor 605 may also be located elsewhere on the front side 108 of the display section 105. For example, the sensor 605 may be located by the side of the display screen 109.

Integrated Speaker & Microphone

For one embodiment, the front side 108 may also include one or more integrated speakers 610. The speakers 610 may be located near the sensor 605. The speakers 610 may be hidden underneath a grid on the front side 108 of the computer system 100, and may be used by applications to provide high quality sound.

Figure 6B:
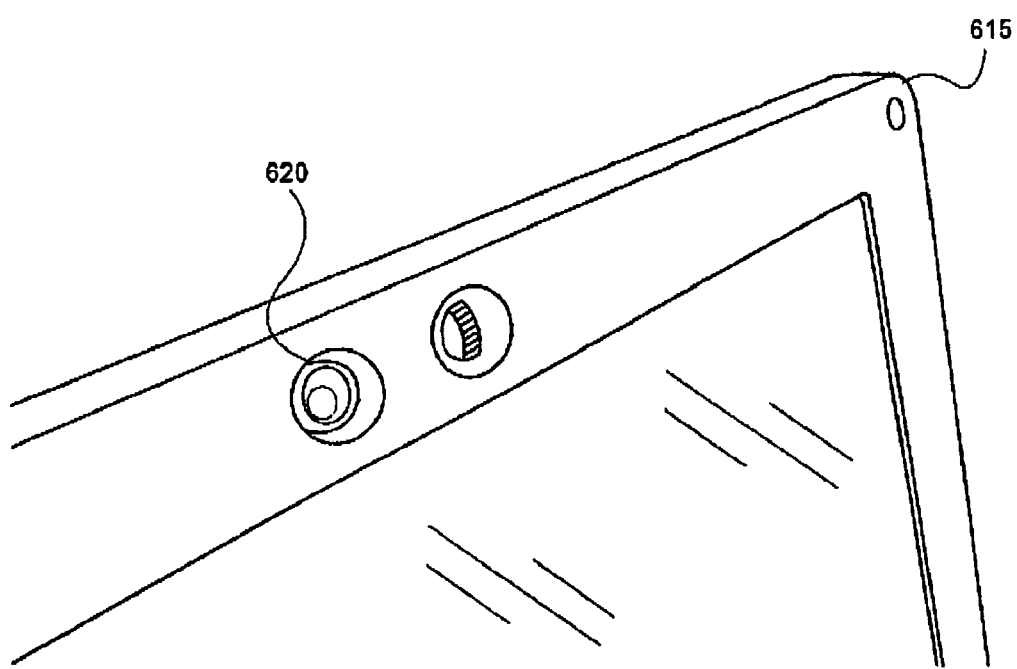
FIG. 6B illustrates an example of a video camera of the computer system, in accordance with one embodiment.
Figure 6C:
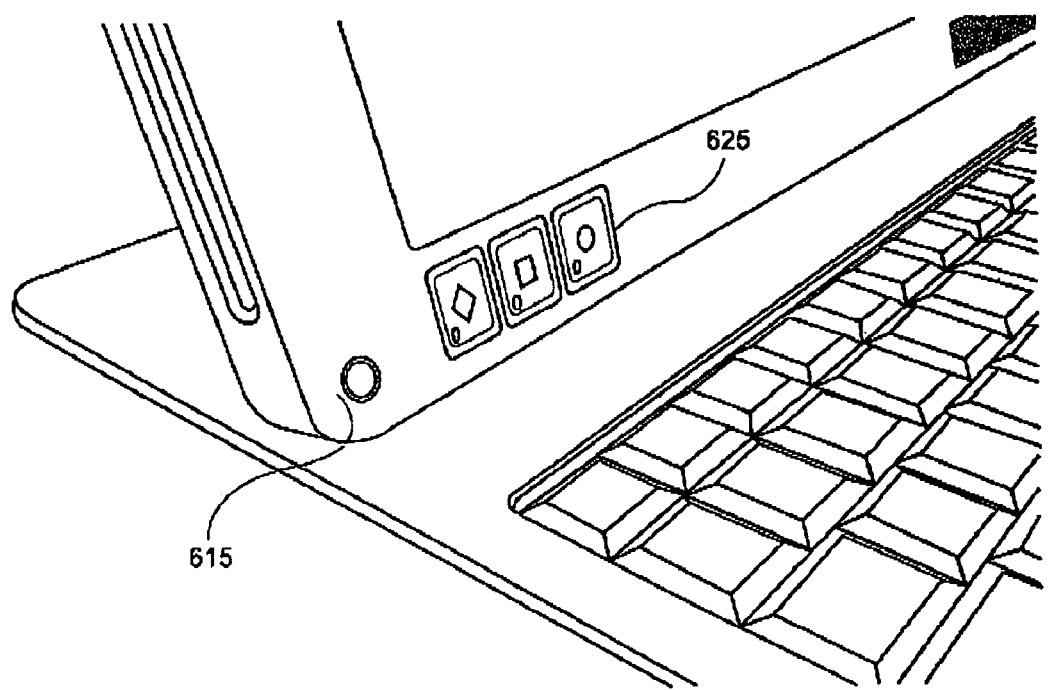
FIG. 6C illustrates an example of a microphone of the computer system, in accordance with one embodiment.

For one embodiment, the front side 108 of the computer system 100 may also include one or more microphones 615 (referred to herein as an array of microphones 615). The array of microphones 615 may be placed on the front side 108 to enable them pick up sound from various angles relative to the front side 108. The array of microphones 575 may enable a user to give voice commands to the computer system 100. For one embodiment, the microphones in the array of microphones may be placed around the display screen 109, as illustrated in FIGS. 6A, 6B and 6C. For another embodiment, the array of microphones 615 may be placed away from a location where noise may be frequently generated (e.g., cooling fan, etc.).

Video Camera

For one embodiment, the front side 108 of the computer system 100 may include a video camera 620, as illustrated in FIG. 6B. The video camera 620 may be used for video conferencing or any type of interaction that may need one or more images to be captured. For example, the video camera 620 may be used to detect user presence or to authenticate a user for access. In this example, the computer system 100 may include biometric recognition software to authenticate a user for instant access without the usual requirement of a user identification number and a password. For one embodiment, the video camera 620 may be controlled by software to point at different angles in front of the computer system 100.

The front side 108 may also include one or more status indicators 625, as illustrated in FIG. 6C. These status indicators 625 may be used to indicate, for example, speaker status, microphone status, video camera status, etc. The status indicators 625 may illuminate to indicate, for example, an on or off condition. In the current example, the status indicators 625 are located near below the display screen 109, although they may also be placed at other places on the front side 108.

Convertible Mode

Figure 7:
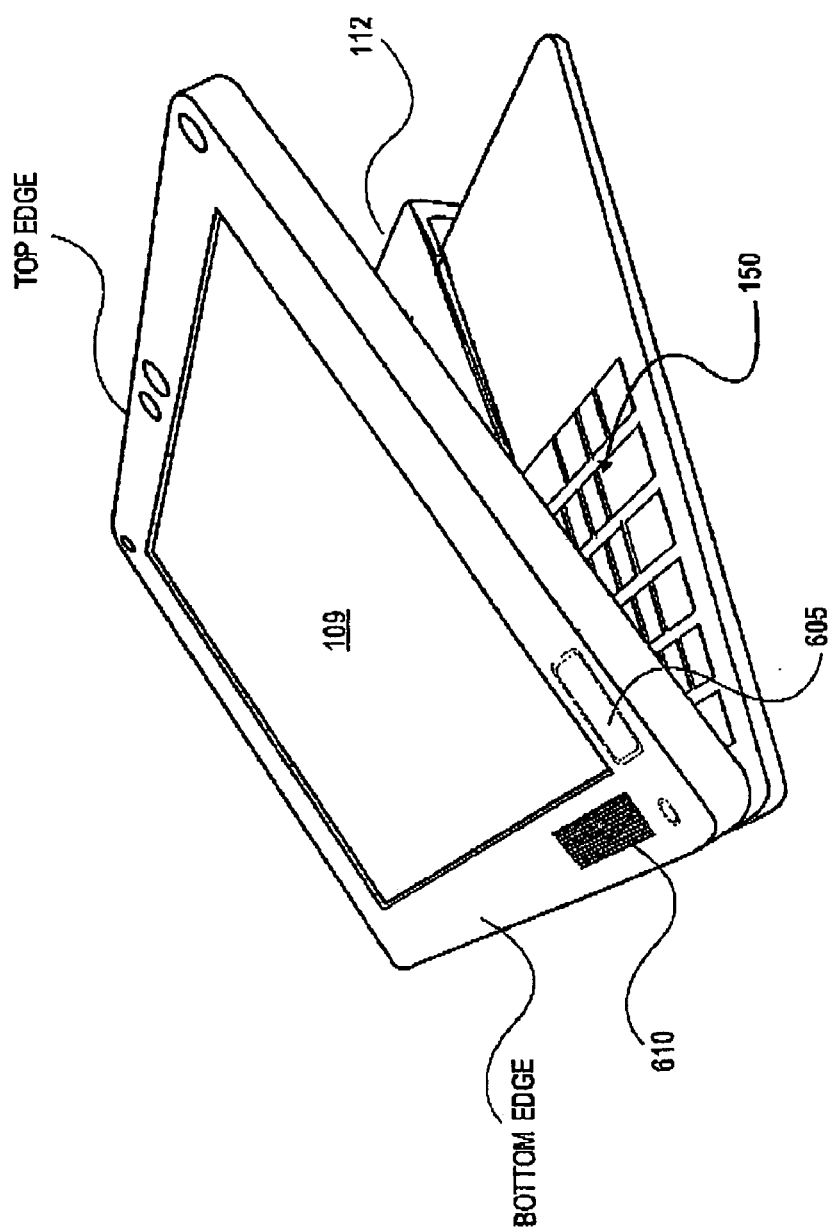
FIG. 7 illustrates one example of the computer system 100 in a convertible mode, in accordance with one embodiment.

FIG. 7 illustrates one example of the computer system 100 in a convertible mode, in accordance with one embodiment. In the convertible mode, the display section 105 may be placed over the base section 101 with the display screen 109 visible. For one embodiment, the computer system 100 may transition from the laptop mode (an example is illustrated in FIG. 5C) to the convertible mode by letting the display section 105 collapse on top of the support arm 110. For example, the bottom edge of the display section 105 may be allowed to slide across the keyboard 150 while the top edge of the display section 105 may be allowed to lay on top of the support arm 110, as illustrated in FIG. 7. The support arm 110 may be made with a rigid material to give it strength to support the display section 105 in the laptop mode. The support arm 110 may also be flexible to enable it to stay between the display section 105 and the base section 101 in the convertible mode.

It may be noted that, in the convertible mode, pressure may be placed on the support arm by the display section 105 and that the second end 112 of the support arm 110 may protrude from between the display section 105 and the base section 101. This may cause the display section 105 to be slightly raised when the computer system 100 is placed on a flat surface. For one embodiment, the back side 107 of the display section 105 may include an indentation (not shown) to accommodate the support arm 110. The indentation may help keep the display section 105 from being slightly raised.

Computer System

Figure 8:
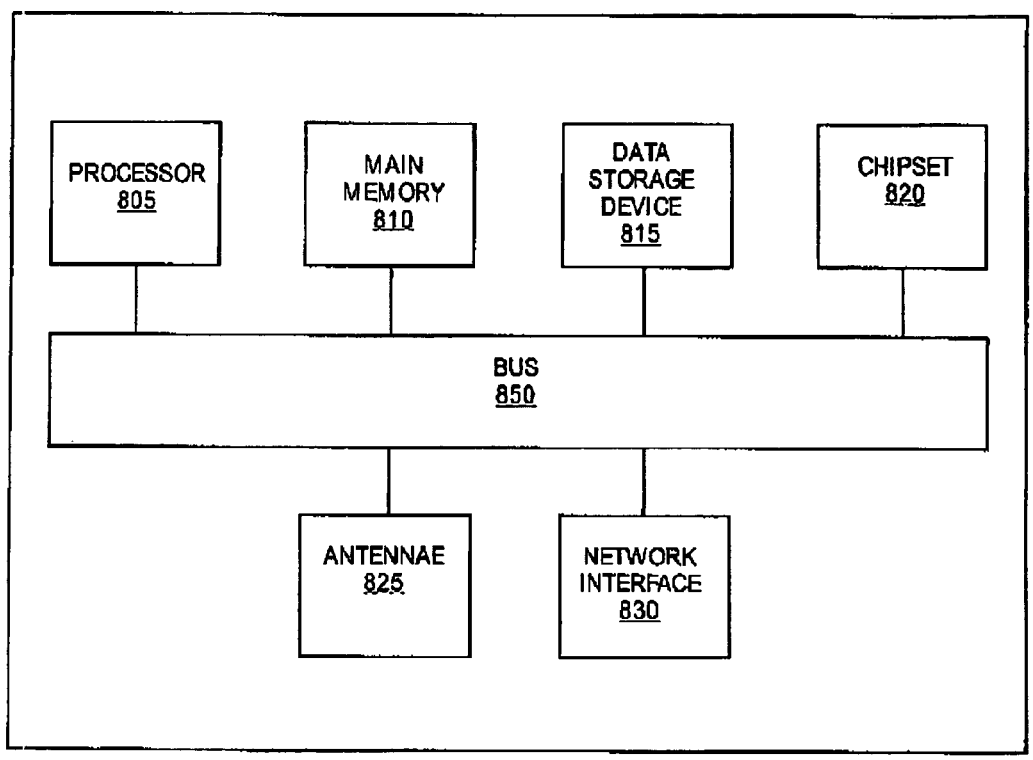
FIG. 8 illustrates an exemplary block diagram of the computer system, in accordance with one embodiment.

FIG. 8 illustrates an exemplary block diagram of the computer system 100, in accordance with one embodiment. The computer system 100 includes a processor 805 coupled to a bus 850. For example, the processor 805 may be a processor in the Pentium® family of processors including the Pentium® II processor family, Pentium® III processors, Pentium® IV processors available from Intel Corporation of Santa Clara, Calif. While the computer system 100 is illustrated with a single processor 805, it may be possible that the computer system 100 may have multiple processors or that the processor 805 may have multiple cores.

Main memory 810 may also be coupled to the bus 850 and may store data and sequences of instructions that are executed by the processor 805 or any other device included in the computer system 100. The main memory 810 may include random access memory (RAM), read only memory (ROM), and/or other type of memory. In addition, data storage device 815 may also be coupled to the bus 850 to store information and instructions. The data storage device 815 may comprise a magnetic disk (e.g., a hard disk), optical disc (e.g., a CD-ROM) and/or digital versatile disc (DVD), etc. The computer system 100 may further include chipset 820. The chipset 820 may include a graphics controller (not shown) and an input/output (I/O) controller (not shown). The graphics controller may manage information to be displayed on the display screen 109 of the computer system 100. The I/O controller may manage I/O devices (e.g., game controller, mouse, etc.) that may be connected to the computer system 100. Connecting to the bus 850 may also be one or more antennae 820 and/or network interface 825, to provide via wireless and/or wireless connections, respectively, access to a network, such as a personal area network, local area network and/or wide area network.

Instructions executed by the processor 805 may be provided to the main memory 810 from a machine-accessible medium, or an external storage device accessible via a remote connection (e.g., over a network via antenna 825 and/or network interface 830) providing access to one or more electronically-accessible media, etc. A machine-accessible medium may include any mechanism that provides (i.e., stores and/or transmits) information in a form readable by a machine (e.g., a computer). For example, a machine-accessible medium may include RAM, ROM, magnetic or optical storage medium, flash memory devices, electrical, optical, acoustical or other form of propagated signals (e.g., carrier waves, infrared signals, digital signals); etc. In alternative embodiments, hard-wired circuitry may be used in place of or in combination with the instructions, and thus the embodiments of the present invention are not limited to any specific combination of hardware circuitry and software instructions.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus, comprising:
    a display section having a back side, the back side including a channel and a keyboard interface, wherein the keyboard interface is included in the channel;
    a base section having a keyboard and coupled to the display section; and
    a support arm having a keyboard cable, wherein a first end of the support arm is adapted to join the channel where a first end of the keyboard cable is coupled with the keyboard interface, wherein a second end of the support arm is attached to the base section where a second end of the keyboard cable is coupled to the keyboard, the second end of the support arm configured in a corner shape to accommodate the display section when the display section overlaps the base section.

2. The apparatus of claim 1, wherein the back side further includes a latching mechanism associated with the channel, the latching mechanism is to enable engaging or disengaging the first end of the support arm to or from the channel, respectively.

3. The apparatus of claim 2, wherein the second end of the support arm is rotatable relative to the base section.

4. The apparatus of claim 3, wherein the second end of the support arm is adapted to accommodate the display section.

5. The apparatus of claim 4, wherein the display section includes a display screen on a front side.

6. The apparatus of claim 5, wherein the display screen is a touch-sensitive screen, and wherein the display section is capable of operating independently of the base section.

7. The apparatus claim 6, wherein the front side further includes a fingerprint sensor.

8. The apparatus of claim 7, wherein the front side further includes a video camera.

9. The apparatus of claim 8, wherein the front side includes one or more speakers.

10. The apparatus of claim 9, wherein the front side further includes an array of one or more microphones.

11. An apparatus, comprising:
    a support arm, to support a detachable display section in an upright position when the detachable display section forms an angle with a base section, wherein a first end of the support arm is coupled to a channel on a backside of the display section, wherein a second end of the support arm is configured in a corner shape to accommodate the display section when the display section overlaps the base section, wherein the support arm is configured to position between the display section and the base section when the angle formed between the display section and the base section is increasingly reduced in a first direction.

12. The apparatus of claim 11, wherein when the angle is increasingly reduced in the first direction, a display screen on the display section is visible.

13. The apparatus of claim 12, wherein the support arm is to at least partially wrap around the display section when the angle between the display section and the base section is increasing reduced in a second direction.

14. The apparatus of claim 13, wherein when the angle is increasingly reduced in the second direction, the display screen on the display section is not visible.

15. The apparatus of claim 11, wherein the support arm includes a keyboard cable to connect a keyboard located on the base section to a keyboard interface located in the channel on the backside of the display section.

16. The apparatus of claim 11, wherein the display section is detached from the base section by detaching the keyboard cable from the keyboard interface.

17. The apparatus of claim 11, wherein the display screen is a touch-sensitive screen.

18. A system, comprising:
    keyboard logic included in a base section; and
    processing logic included in a display section, wherein the processing logic is to operate with input entered using a keyboard when the display section is coupled to the keyboard in a laptop mode using a support arm, wherein a first end of the support arm is coupled to the display section and a second end of the support arm is coupled to the base section, the second end configured to form a corner to accommodate the display section when the display section overlaps the base section.

19. The system of claim 18, wherein the display section includes a touch-sensitive display screen operable when configured in a tablet mode or a convertible mode.

* * * * *